United States Patent [19]

Larsen

[11] 3,934,770
[45] Jan. 27, 1976

[54] COLLAPSIBLE BICYCLE ARTICLE CARRIER

[76] Inventor: Elizabeth Larsen, 137 Bluefield Ave., Newbury Park, Calif. 91320

[22] Filed: Aug. 30, 1974

[21] Appl. No.: 502,061

[52] U.S. Cl. ............. 224/33; 224/32 A; 224/42.36; 220/6; 211/132
[51] Int. Cl.² ......................................... B62J 9/00
[58] Field of Search........ 224/33 R, 32 A, 33 A, 31, 224/42.34, 42.36; 220/6, 7; 211/178, 132, 181

[56] References Cited
UNITED STATES PATENTS

| | | | |
|---|---|---|---|
| 567,159 | 9/1896 | Peirce | 224/33 R |
| 582,229 | 5/1897 | Reynolds | 224/33 A |
| 963,769 | 7/1910 | Johnson et al. | 220/6 |
| 1,449,419 | 3/1923 | Kraus | 224/42.46 B |

FOREIGN PATENTS OR APPLICATIONS

| | | | |
|---|---|---|---|
| 743,029 | 1/1956 | United Kingdom | 224/32 A |

*Primary Examiner*—Robert J. Spar
*Assistant Examiner*—Jerold M. Forsberg
*Attorney, Agent, or Firm*—Jack C. Munro

[57] ABSTRACT

An article carrier which is to be mounted over the rear wheel of a bicycle and includes a pair of baskets, one each on either side of the bicycle wheel. Each basket is connected through a scissor linkage assembly to be collapsible adjacent the bicycle wheel.

2 Claims, 5 Drawing Figures

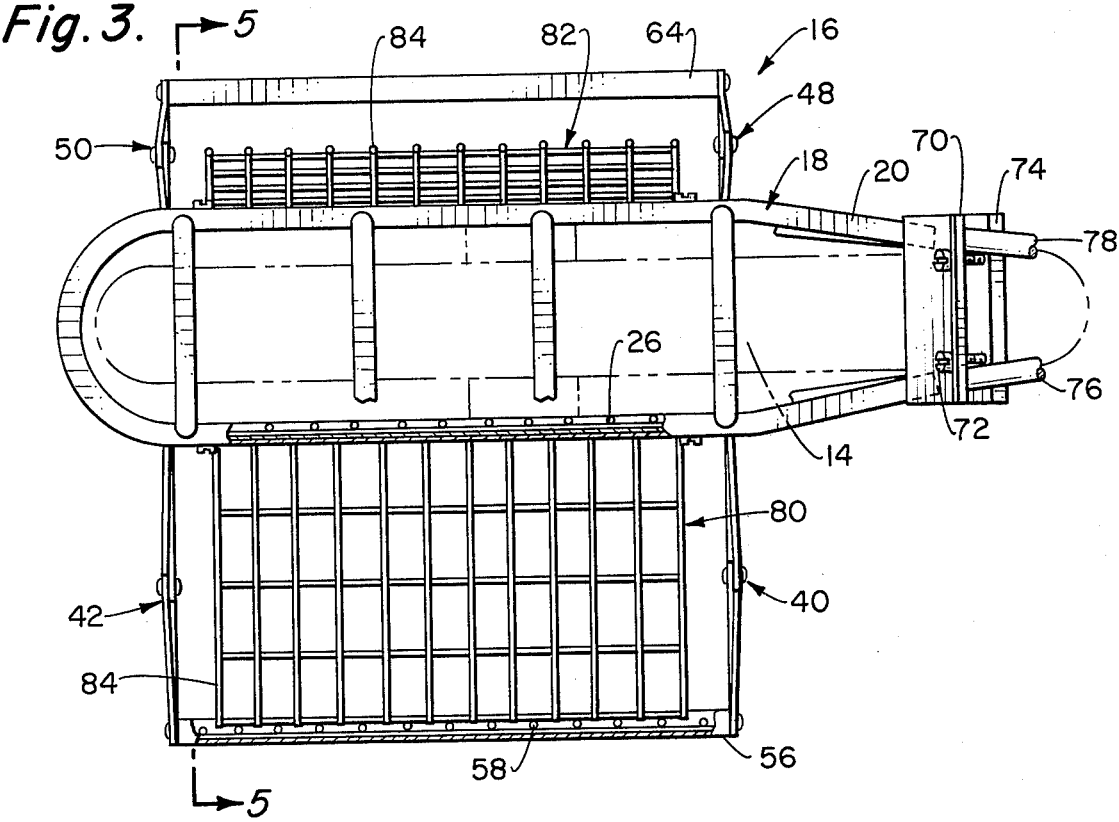
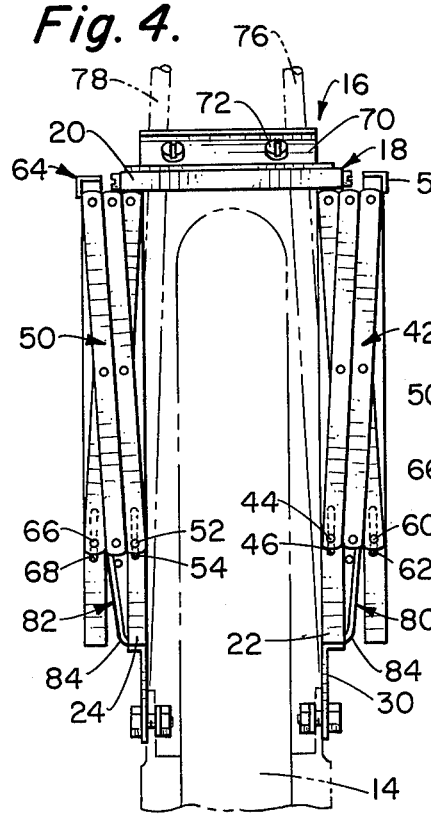
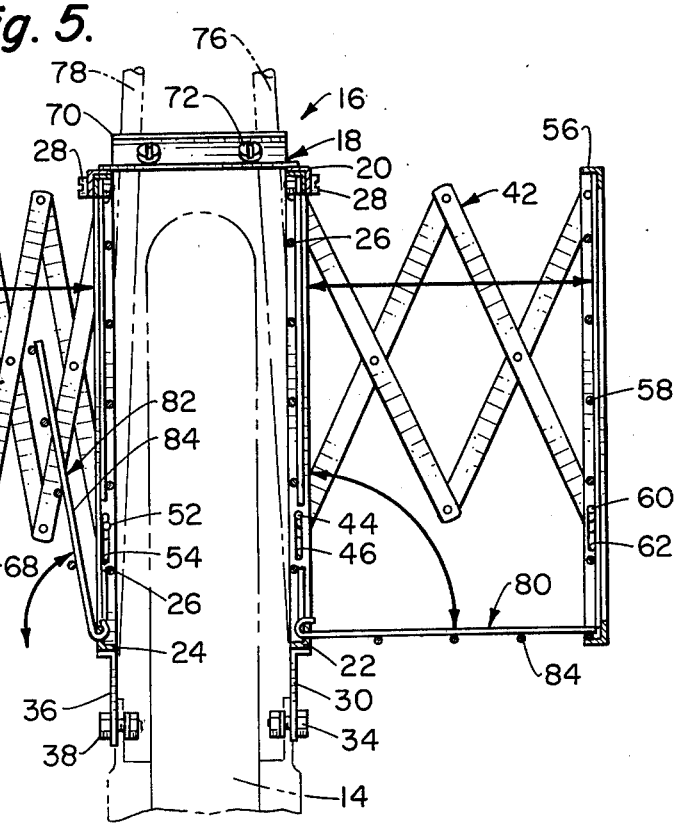

COLLAPSIBLE BICYCLE ARTICLE CARRIER

BACKGROUND OF THE INVENTION

The field of the invention relates to bicycles, and more particularly to a collapsible article carrying basket assembly which is to be mounted over the rear wheel of the bicycle.

Most bicycles do not employ a convenient type of device for readily carrying articles, such as grocery bags. A front basket is a conventional type of carrying basket and is mounted on the front portion of the bicycle over the front wheel. This front basket can only carry a single bag, such as a grocery bag, and since it is on the front portion of the bicycle, this bag frequently can and does interfere with the steering of the bicycle.

Previously, there have been attempts at designing a carrying basket assembly to be located over the rear wheel of the bicycle. However, such carrying baskets have been quite complex in construction and as a result were expensive to manufacture. Additionally, most carrying baskets were not collapsible and when not in use would readily interfere with storage of the bicycle and carrying of the bicycle on another vehicle, such as an automobile. Also, such bicycle carrying baskets interfere with parking of the bicycle in a public bicycle rack.

Previously, there have been some attempts at designing collapsible baskets for the rear wheel of a bicycle. However, such collapsible baskets have been complex in construction and were difficult to open and close.

SUMMARY OF THE INVENTION

The structure of this invention relates to a fixed U-shaped frame which is to be mounted over the rear wheel of a bicycle. On either side of the U-shaped frame is mounted a scissor-linkage assembly. To each scissor-linkage assembly is attached an outer sidewall. The outer sidewall is movable to a collapsed position against the frame of extendible by the scissor-linkage assembly to a position spaced from the frame. When spaced from the frame, a bottom grill member for each basket is pivotable from a position adjacent the frame to a position substantially 90° to the frame and connectable with the outer sidewall. Each basket on each side of the bicycle wheel is operable independently of each other.

The structure of this invention is a convenient and safe way to carry large grocery bags and bulky packages. The structure of this invention facilitates using the bicycle as a trail bike by carrying packages for camping purposes. The structure of this invention is an easy practical way to carry food, pup tents, sleeping bags, etc. by bicycles. The structure of this invention provides quite large compartments, when in use, but when not in use, the structure is collapsed very closely to the bicycle structure and therefore will not interfere with storage and transporting. The structure of this invention facilitates parking of the bicycle within a garage and also does not interfere with bicycle racks. The structure of this invention is easily openable and closeable. The structure of this invention is also of sufficient strength to be used as a second seat for the bicycle. The structure of this invention is easily installed with simple hand tools and is adjustable to fit all 26 inch and 27 inch bicycles.

BRIEF DESCRIPTION OF THE DRAWINGS

FIG. 3 is a plan view similar to FIG. 2 but showing one side of the article carrier in an expanded position;

FIG. 4 is a rear view of the article carrier of this invention taken along line 4—4 of FIG. 1; and FIG. 5 is a view similar to FIG. 4 but showing the expanding procedure of the article carrier of this invention.

BRIEF DESCRIPTION OF THE SHOWN EMBODIMENT

Figure 1:
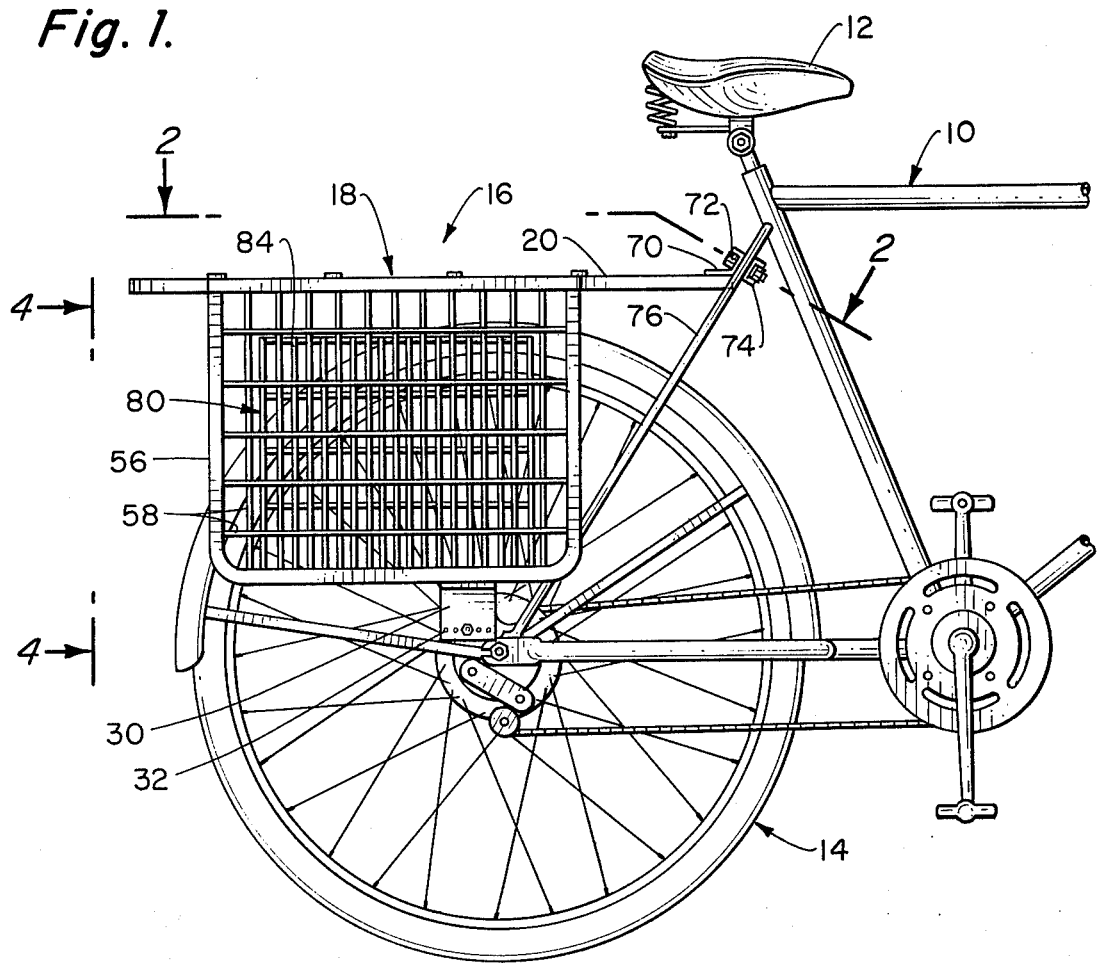
FIG. 1 is a side view of the rear portion of a bicycle on which the article carrier of this invention has been installed.

Referring particularly to the drawings, there is shown in FIG. 1, the rear portion of a bicycle which is composed generally of a bicycle frame 10 to which is attached a bicycle seat 12 and the rear wheel 14 of the bicycle. The bicycle is of conventional construction and need not be described herein in detail. The structure of this invention comprises an article carrier defined generally as numeral 16. Although the carrier 16 is particularly adapted for location over the rear wheel 14 of a bicycle, it is considered to be within the scope of this invention to mount the carrier 16 of this invention in other locations upon a bicycle or upon other types of vehicles, such as motorcycles, motorscooters, and the like.

The carrier 16 of this invention includes a frame 18 which is essentially in a U-shape configuration. The U-shape frame 18 includes an apex member 20 which is generally in the form of a frame which is to be mounted so as to function as a separate seat of the bicycle. In other words, a person may be carried by actually sitting on the frame 20.

Attached to the frame 20 is a right leg assembly 22 and a left leg assembly 24. Both the leg assemblies 22 and 24 are substantially identical in configuration and composed of a metal border structure to which are passed a plurality of small wire rods 26. The rods 26 are arranged to form a grill type of pattern which prevents most articles from becoming accidentally dislodged from the carrier 16 of this invention. The leg assemblies 22 and 24 are attached by appropriate fasteners, such as bolts 28 to the apex member 20.

The lower side of the leg assembly 22 is attached by bracket 30 to a portion of the wheel structure of the bicycle. The bracket 30 includes a series of apertures 32 therein to facilitate adjustment of the carrier 16 of this invention to different size and/or different types of bicycles. The fastening of the bracket 30 is accomplished through conventional fastening means, such as a bolt 34.

In a similar manner, a bracket 36 is fixed to the leg assembly 24 and connects such by means of a bolt 38 to the wheel structure of a bicycle. It is to be understood that the bracket 36 includes apertures 32 (not shown). The resulting attachment is such that the leg assemblies 22 and 24 are located on opposite sides of the wheel 14. The construction of the carrier 16 is such that the leg assemblies 22 and 24 are located in a substantially parallel arrangement.

Connected to the leg assembly 22 is a scissor-linkage assembly comprising a forward scissor-linkage unit 40 and an aft scissor-linkage unit 42. The forward scissor-linkage unit 40 and the aft scissor-linkage unit 42 is identical in construction. Within each scissor-linkage unit 40 and 42, one of the links is slideable by means of being connected to a pivot pin 44 which is slideable within a slot 46. The length of the slot 46 determines the amount of outward movement of each of the scissor-linkage assemblies 40 and 42. It is to be understood that there is a given pin 44 and a given slot 46 for each of the linkage units 40 and 42. The slot 46 is formed within the right leg assembly 22.

In a manner similar to what has been previously described, a forward scissor-linkage unit 48 and an aft scissor-linkage unit 50 is connected to the leg assembly 24. A pin 52 is located on each of the units 48 and 50 and each said pin cooperates within a respective said slot 54 of the leg assembly 24.

Attached to the free end of the units 40 and 42 is an outer wall 56. The outer wall 56 is formed of a metal border through which are interposed a series of small diametered wire rods 58 in a grill-like pattern in order to prevent small articles from accidentally falling through the carrier 16. One of the links of each of the linkage units 40 and 42 are connected through a pin 60 to a slot 62 which is formed within the border member of the outer wall 56. The length of the slot 62 will be the same as the length of the slot 46. It is to be understood that the other link of the scissor-linkage is pivotally connected by means of a pin to the border element of the outer wall 56, but it is not movable within a slot. This type of connection is true for one of the links connected to the leg 22 and the leg 24.

A similar outer wall 64 is connected to the free end of the linkage units 48 and 50. Again in a similar manner one of the links of the scissorlinkage units 48 and 50 is pivotally connected through a pivot pin to the outer wall 64 with the other link of the units 48 and 50 connected through a pin 66 which rides within a slot 68 formed in the outer wall 64. The construction of the outer wall 64 is substantially identical to the construction of outer wall 56.

The forwardmost end of the apex 20 is fixed to a bracket 70. The bracket 70 includes a plurality of apertures therein which cooperate with a plurality of fasteners, such as bolts 72. The bolts 72 connect with a back plate 74. A portion of the bicycle frame 10, frame rods 76 and 78, are located between the bracket 70 and the plate 74. The bolts 72 function to secure tightly in a clamping manner the brackets 70 and the back plate 74 to the frame rods 76 and 78. As a result, a secure mounting of the carrier 16 of this invention is accomplished through means of the bracket 70 and the brackets 30 and 36.

A bottom grill member 80 is pivotally connected to the first leg assembly 22 adjacent the lowermost end of the first leg assembly 22. In a similar manner, a bottom grill member 82 is pivotally connected to the lower side of the leg assembly 24. Each of the grill members 80 and 82 are composed of wire rods 84 which are arranged in a grill-like pattern. The bottoms 80 and 82 are substantially identical in construction. Each of the bottoms 80 and 82 are pivotable to a position directly adjacent its respective leg assembly 22 or 24 and to a position substantially 90° displaced.

To assemble the carrier 16 of this invention and install such upon a bicycle would require a minimum of tools and could be accomplished quite easily by one following a few simple instructions.

Figure 2:
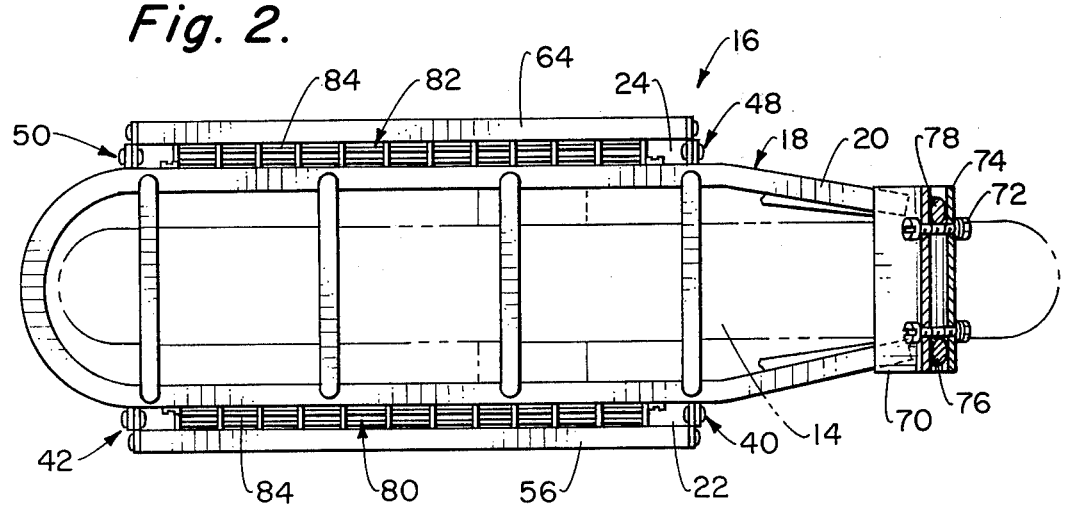
FIG. 2 is a plan view of the rear portion of a bicycle upon which the article carrier of this invention has been installed taken along line 2—2 of FIG. 1.

The operation of the carrier 16 of this invention would be as follows: When not in use the carrier 16 is in the collapsed position which is shown in FIG. 2. In this position the outer wall 56 is directly adjacent the leg assembly 22 with the outer wall 64 located directly adjacent the leg assembly 24. In this position, the bottom 80 is also located directly adjacent the leg assembly 22 with the bottom 82 located directly adjacent its leg assembly 24. Now let it be assumed that it is desired to extend the carrying unit of the carrier located on the right side of the bicycle. To accomplish this, the person merely grasps the outer wall 56 and moves such in an outward direction which is permitted by means of the scissor-linkage units 40 and 42. When in the outermost position, the pins 44 and 60 are in contact with an end of their respective slots 46 and 62 thereby determining the amount of outward movement of the outer wall 56. Once this position has been established, the bottom 80 is merely pivoted 90° so that the outermost end of the bottom 80 rests upon the outer wall 56. Once in this position, the friction within the hinge joints of the scissorlinkage units 40 and 42 cause the carrier to maintain this position. Also, when in the closed position, with the wall 56 adjacent the leg assembly 22, the friction within the hinge joints of the scissor-linkage units 40 and 42 maintain the carrier in this position. When in the open position, the carrying unit is capable of supporting articles such as a grocery sack. The scissor-linkage units 40 and 42 themselves function as forward and rearward restraining walls for the article or articles retained therein.

If it is desired to also extend the other carrying unit, the outer wall 64 is to be moved in the outward position and the bottom 82 is pivoted in the same manner as bottom 80 was pivoted.

The elements of the carrier of this invention will normally be constructed of sheet metal. However, it is considered to be within the scope of this invention to construct the unit of any rigid material, if desired.

Also, the wire rod grill unit employed within the carrier of this invention could be altered to a netting type of configuration, if desired, or even possibly could be eliminated or changed in configuration.

1. A collapsible bicycle article carrier comprising:
 a fixed frame;
 said frame being substantially U-shaped in configuration with said frame having a pair of substantially parallel, spaced apart legs, said frame adaptable to be placed over the rear wheel of a bicycle with one of said legs located on either side of the bicycle wheel and the apex portion of the frame forming an additional seat for the bicycle
 a carrying unit attached to each said leg, each carrying unit formed of the following elements:
 a scissor-linkage assembly attached to said frame, said scissor-linkage assembly comprising a plurality of pivotally connected links, two in number of said links being pivotally connected to said frame forming a first pair of separate connection points, one of said connection points of said first pair being slidably movable with respect to said frame between a first position and a second position;
 an outer wall connected to the free end of said scissor-linkage assembly, two in number of said links being pivotally connected to said outer wall forming a second pair of separate connection points, one of said connection points of said second pair being slidably movable with respect to said outer wall, said outer wall movable by said scissor-linkage assembly between a closed position and an open position, said closed position being when said outer wall is located directly adjacent said frame with said movable connection point of said first pair in said first position, said open position being when said outer wall is spaced from said frame with said movable connection point of said first pair in said second position; and a bottom connected between said outer wall and said frame when said outer wall is in said open position, said bottom pivotally connected to said frame, said bottom positioned against said frame when said outer wall is in said closed position.

2. The bicycle article carrier as defined in claim 1 wherein:

said outer wall comprising a wire grill, said bottom comprising a wire grill.

* * * * *